United States Patent
Sherwin et al.

(10) Patent No.: US 6,796,408 B2
(45) Date of Patent: Sep. 28, 2004

(54) METHOD FOR VIBRATION DAMPING USING SUPERELASTIC ALLOYS

(75) Inventors: Yang Sherwin, Chatsworth, CA (US); Donald G. Ulmer, Moorpark, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/242,870

(22) Filed: Sep. 13, 2002

(65) Prior Publication Data

US 2004/0051219 A1 Mar. 18, 2004

(51) Int. Cl.[7] ................................................. F16F 7/10
(52) U.S. Cl. ........................................................ 188/378
(58) Field of Search .............................. 188/378, 266.1, 188/268, 276; 416/500, 241 R

(56) References Cited

U.S. PATENT DOCUMENTS

| 4,192,633 | A | * | 3/1980 | Herzner .................... 416/221 |
| 4,776,763 | A | * | 10/1988 | Light ........................ 416/145 |
| 5,005,678 | A | * | 4/1991 | Julien et al. ................ 188/378 |
| 5,281,097 | A | * | 1/1994 | Wilson et al. .......... 416/193 A |
| 5,373,922 | A | * | 12/1994 | Marra ........................ 188/379 |
| 5,398,916 | A | * | 3/1995 | Kramer et al. ................ 267/70 |
| 5,405,337 | A | * | 4/1995 | Maynard .................... 604/531 |
| 5,487,484 | A | * | 1/1996 | Bonniau et al. ............ 220/201 |
| 5,490,759 | A | * | 2/1996 | Hoffman ...................... 415/10 |
| 5,498,137 | A | * | 3/1996 | El-Aini et al. ......... 416/229 A |
| 5,508,116 | A |   | 4/1996 | Barrett ........................ 428/567 |
| 5,611,874 | A |   | 3/1997 | Zadno-Azizi et al. ....... 148/402 |
| 5,687,958 | A | * | 11/1997 | Renz et al. ................. 267/136 |
| 5,709,527 | A | * | 1/1998 | Ernst et al. .................... 415/10 |
| 5,750,272 | A |   | 5/1998 | Jardine ........................ 428/686 |
| 5,785,499 | A | * | 7/1998 | Houston et al. ............ 416/248 |
| 5,842,312 | A | * | 12/1998 | Krumme et al. ........... 52/167.1 |
| 5,973,440 | A |   | 10/1999 | Nitzsche et al. ............ 310/326 |
| 6,010,584 | A | * | 1/2000 | Fonda et al. ............... 148/563 |
| 6,024,347 | A | * | 2/2000 | Grosskrueger et al. ..... 267/220 |
| 6,102,664 | A | * | 8/2000 | Nguyen ...................... 416/248 |
| 6,116,389 | A | * | 9/2000 | Allaei ........................ 188/378 |
| 6,171,058 | B1 | * | 1/2001 | Stec ........................ 416/193 A |
| 6,290,037 | B1 | * | 9/2001 | Williams et al. ............ 188/379 |
| 6,447,478 | B1 | * | 9/2002 | Maynard ................. 604/95.05 |
| 6,497,551 | B1 | * | 12/2002 | Hand et al. .................... 415/9 |
| 6,527,938 | B2 | * | 3/2003 | Bales et al. .................. 205/229 |
| 2002/0121414 | A1 | * | 9/2002 | Barcock et al. ............. 188/268 |
| 2002/0164253 | A1 | * | 11/2002 | von Flotow ................ 416/248 |
| 2003/0156942 | A1 | * | 8/2003 | Villhard .................... 416/96 R |

* cited by examiner

Primary Examiner—Robert A. Siconolfi
Assistant Examiner—Devon Kramer
(74) Attorney, Agent, or Firm—Harness, Dickey & Pierce, P.L.C.

(57) ABSTRACT

A method is provided for damping vibrations in a turbine. The method includes performing structural dynamics analysis on the turbine to determine at least one area of high vibrational stress on the turbine, and performing thermal analysis of the turbine to determine at least an approximated maximum operating temperature at the area of high vibrational stress. Additionally, the method includes utilizing hysteresis damping to dampen operational vibrations. The hysteresis damping includes selecting a shape memory alloy (SMA) having a martensitic-to-austenite transformation temperature substantially similar to the approximate maximum operating temperature of the component at the area of high vibrational stress, and disposing the selected SMA on the turbine on the related area of high vibratory stress.

18 Claims, 3 Drawing Sheets

BLADE SUCTION SIDE

BLADE PRESSURE SIDE

SHAPE MEMORY ALLOY (SMA)

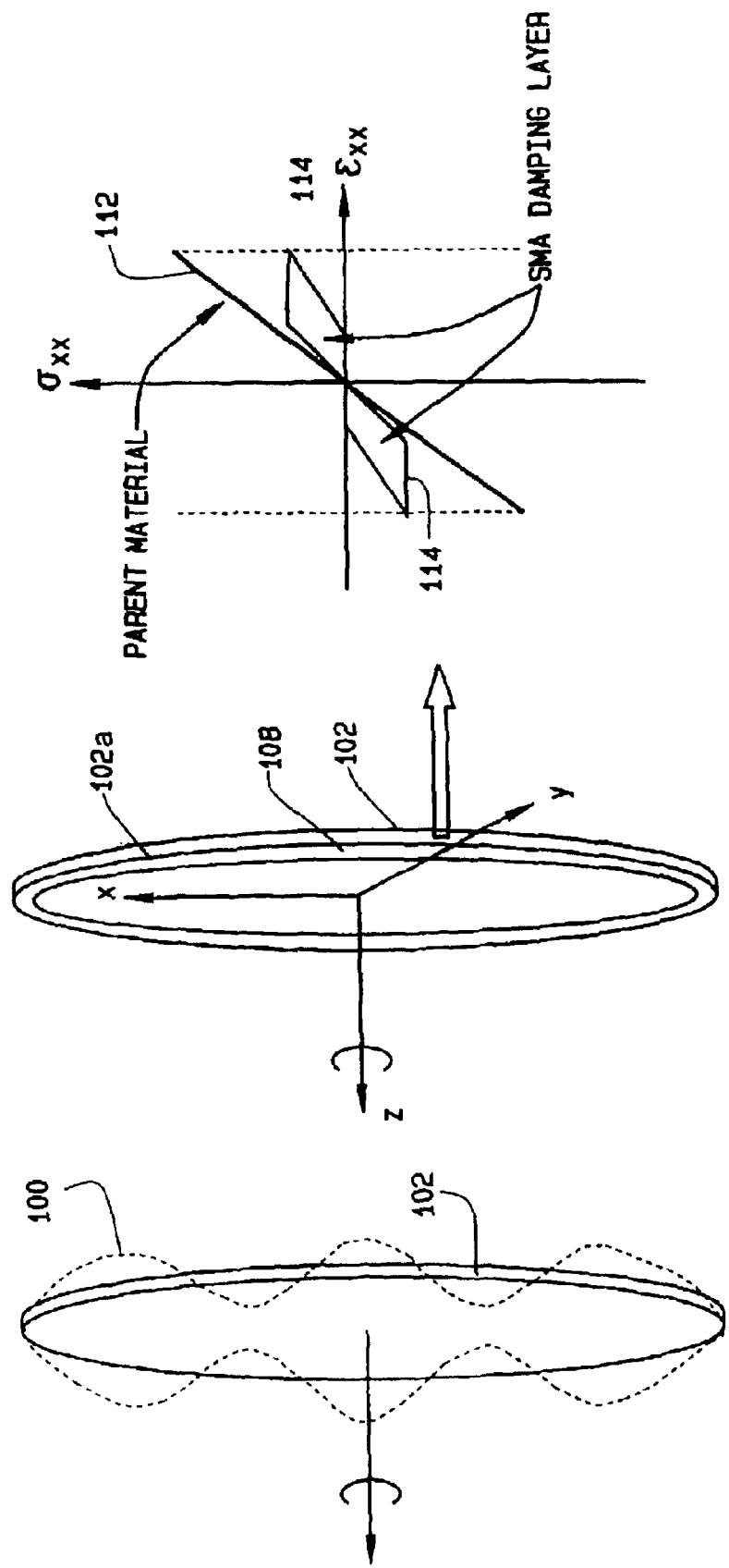

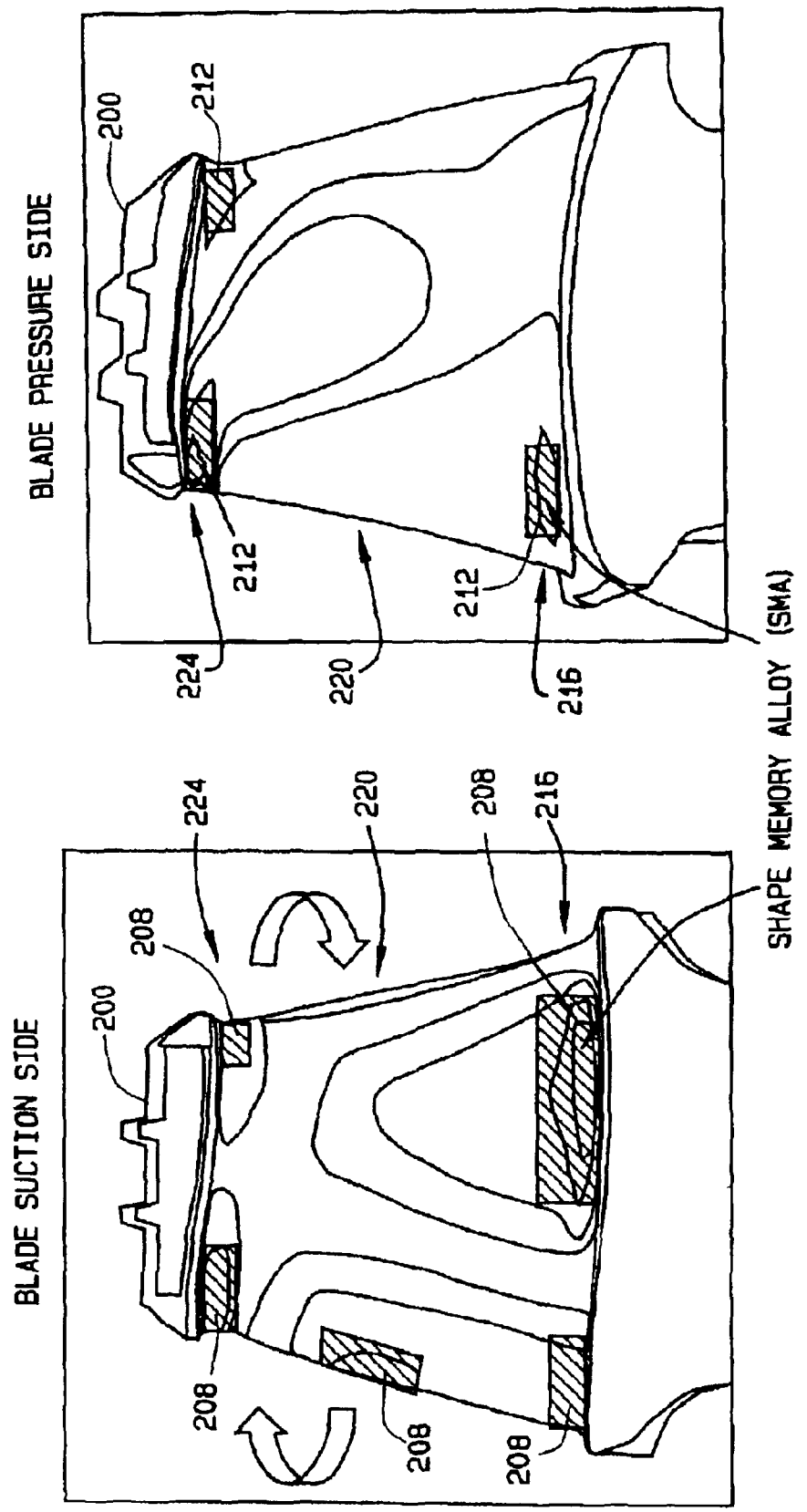

METHOD FOR VIBRATION DAMPING USING SUPERELASTIC ALLOYS

FIELD OF INVENTION

The invention relates generally to damping vibrations in dynamically loaded metal components. More specifically, the invention relates to utilizing Shape Memory Alloys (SMAs) for damping vibrations in rotating components and system lines, thereby reducing fatigue failures.

BACKGROUND OF THE INVENTION

Dynamically loaded parts, such as high energy rotating components of turbine engines and pumps, can be subject to highly damaging vibrational forces during operation. During the design stage, a rough estimate of the vibrational modes is made and the operational RPM is designed to avoid the resonance of the predicted vibrational modes. In addition, blade tip dampers, frictional dampers and damper seals are routinely incorporated to further reduce the potential of detrimental vibrations. Sometimes redesign of rotation components are required due to component failures encountered during the development phase. In addition, the success of the redesign hinges on the understanding of the newly uncovered vibrational modes through failure analysis.

Superelastic alloys, or shape memory alloys (SMA), have the unique ability to be repeatedly deformed to high strain levels and still return to their original shape each time a load is applied without accumulating classic fatigue damage. This unique behavior is attributed to a strain-induced martensitic transformation in the near martensite crystal structure. In the fully martensitic state, the alloy deforms by a twinning mechanism changing crystallographic variants of the martensites. A hysteresis loop forms as the load is reversed. A high degree of mechanical energy dissipation, or internal damping, is associated with the fully reversible martensitic phase transformation, or twinning, that is characteristic of superelastic alloys. This damping mechanism is called hysteresis damping and is independent of vibrational frequency. High internal damping is beneficial in preventing premature fatigue failures in components subjected to large vibrating forces, which are often encountered in gas turbines, pumps and compressors.

Many propulsion components, e.g. turbine blades and disks, are subject to high vibration levels that can cause serious fatigue damage. Current solutions to protect against fatigue damage involve frictional damping, geometric attachments to reduce vibrational amplitudes for predicted vibrational modes, and use of frictional damper seals and inserts. The frictional damping may fail due to sticking of the frictional interface, and geometrical changes may not be possible due to the design being constrained by the specific strength and density of the component material. Additional drawbacks of current solutions include frequency dependent damping that requires precise knowledge of the vibrational modes of the component and drilling holes in the component for mechanical attachment resulting in an extra parts count.

It would therefore be desirable to employ the use of superelastic alloys in the construction of dynamically loaded parts, such as rotating components and system lines, to reduce vibrational amplitudes and eliminate premature fatigue failures.

BRIEF SUMMARY OF THE INVENTION

In a preferred form, the present invention is directed to a method for damping vibrations in a turbine. The method includes performing structural dynamics analysis on the turbine to determine at least one area of high vibratory stress on the turbine, and performing thermal analysis of the turbine to determine at least an approximate maximum operating temperature at the area of high vibratory stress. Additionally, the method includes utilizing hysteresis damping by selecting a shape memory alloy (SMA) having a martensitic-to-austenite transformation temperature substantially similar to the approximate maximum operating temperature at the area of high vibratory stress and disposing the selected SMA on the turbine at the related area of high vibratory stress.

In another preferred form, the present invention is directed to a turbine engine that is resistant to vibratory damage during operation. The engine includes a housing and a disk and blade assembly rotatable within the housing, wherein the disk and blade assembly has at least one area susceptible to high vibratory stress during operation of the engine. The engine further includes a shape memory alloy (SMA) disposed on the disk and blade assembly at the area of high vibratory stress. The SMA is adapted to dissipate vibrational energy in the blade and/or disk as a result of hysteresis loops generated by the SMA.

BRIEF DESCRIPTION OF THE DRAWINGS

The present invention will become more fully understood from the detailed description and accompanying drawings, wherein;

FIGS. 2a–2c are graphical representations of the damping effects of a SMA, in accordance with a preferred embodiment of the present invention; and FIGS. 3a and 3b are examples of structural dynamics analysis for a turbine engine blade showing the location of areas of high vibrational stress.

DETAILED DESCRIPTION OF THE INVENTION

Shape memory alloys (SMA) undergo an austenite-to-martensite transformation easily and are engineered to exhibit a martensitic transformation temperature that is near a specific application temperature. The transformation can be triggered by temperature changes, by external stresses, or by both. At a temperature near a austenite-to-martensite transformation boundary, a small externally applied load triggers the martensitic transformation and allows a plastic deformation to take place by a thermally reversible austenite-to-martensite transformation. When an external load is applied at a constant temperature, an austenitic SMA material is brought to the boundary of martensitic transformation and eventually transforms to martensite. In the martensitic state, the material elongates under external load through a twinning mechanism. Under cyclic loads, the superelastic SMA generates hysteresis loops during the cyclic deformation. The hysteresis loops signify energy dissipation during the cyclic deformation.

Figure 1A:
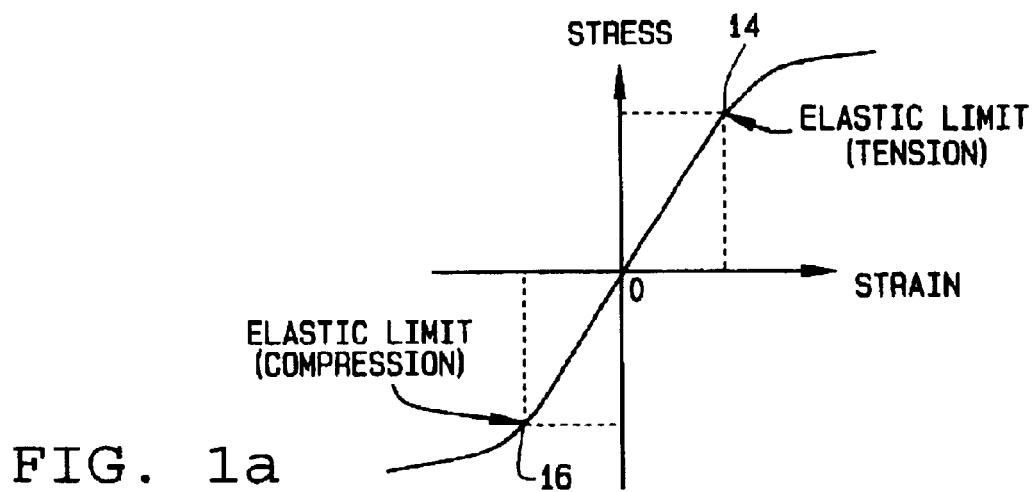
FIGS. 1a–1c are a graphical illustrations of hysteresis damping, in accordance with the present invention.
Figure 1B:
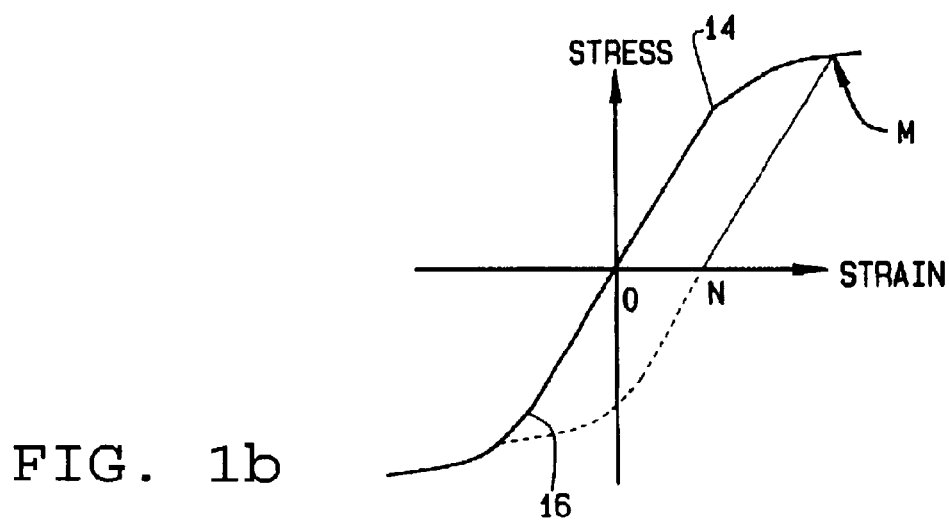
Figure 1C:
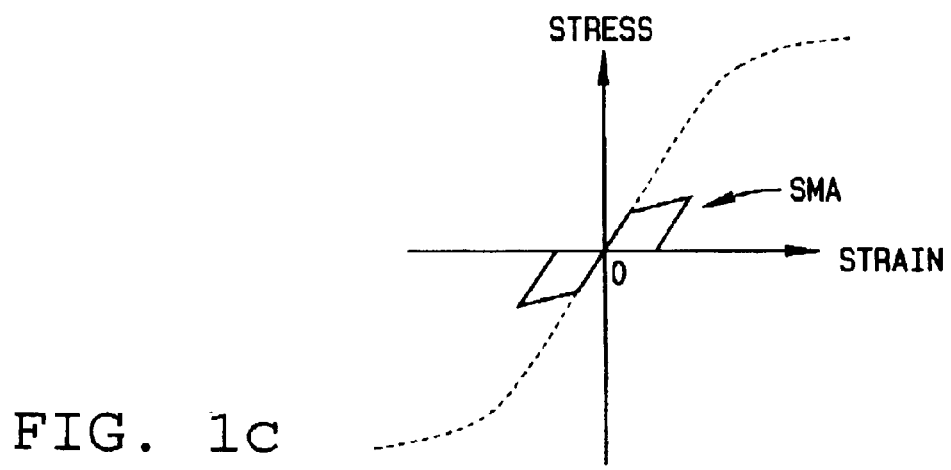

FIGS. 1a through 1c are graphical illustrations of hysteresis damping, in accordance with the present invention. Vibrational loads cause cyclic deflection of a vibrating component or structure. Most components, or structures, are designed to sustain operational loads without plastic deformation. Therefore, the vibrational deflection stays within the elastic range of the material used to construct the component or structure. For example, as shown in the stress-strain plot shown in FIG. 1a, the deflection of an exemplary generic component follows a straight line within the elastic limit of the component material between a tension limit 14 and a compression limit 16. The strain energy built up during a forward deflection is released completely when the deflection returns to a strain-free state, that is the stress and strain return to zero. This deflection is thermodynamically reversible with very little energy loss.

When the deflection of the component exceeds the elastic limit, the stress-stain curve deviates from the straight line, as shown in stress-strain plot of FIG. 1b. If the stress is reversed at point M, the material relaxes to the stress-free condition indicated at point N. Under this scenario, the energy expended in deforming the matter from 0 to M is not completely recovered by the relaxation from M to N, as a permanent strain exists in the stress-free state. If the stress reversal continues in the compressive direction, the stress-strain curve follows the behavior indicated by the dashed line. Repeating the forward-and-reverse deflections beyond the elastic limit defines loops referred to as hystereis loops. The area defined by a hysteresis loop is proportional to the energy expended per cycle of deflection. Repeatedly deforming the component into its plasticity zone causes fatigue fractures in the component.

The stress-strain curves for SMAs deviate from linearity at a small deflection, as indicated in stress-strain plot shown in FIG. 1c. The non-linearity of the SMAs form hysteresis loops similar to those generated by plastic deformation of conventional metals. However, the non-linearity of the SMAs is attributable to the austenite-martensite transformation and the twinning within the martensite phase. Forward and reverse transformations of the austenite and martensite phases require overcoming activation energies for the transformation. The presence of the activation energies contribute to the hysteresis and the energy dissipation process. By selecting the transformation temperature to be close to the maximum operating temperature of the component on which the SMA is to be disposed, the activation energy is lowered. The lower activation energy reduces the deflection at which the hysteresis loop will start, and also reduces the energy expended per cycle. By disposing a layer of SMA on either an entire component or high stress areas of the component, the SMA will deflect in the strain range of the component material elastic limits, thereby forming hysteresis loops and dissipating the vibrational energy.

This behavior can be exploited for damping the vibratory energy of devices suffering from fatigue damage due to the vibrations. Although all metallic materials generate a hysteresis loop under cyclic plasticity, the usefulness of the superelastic SMA is derived from its ability to generate a hysteresis loop that begins at a low stress/strain amplitude, and is sustained at a high stress/strain amplitude. Thus, the vibratory energy begins to be dissipated before it can be built up to a resonance condition.

When a SMA is disposed on, e.g. bonded or attached to, a component, the damping characteristic can be used to attenuate vibratory resonance of the component. The beneficial damping effects of utilizing a SMA to dampen vibrations is dependent on an understanding of the temperature variations within the subject component. For example, in gas turbine and jet engine applications, the turbine includes a disk and blade assembly, wherein a plurality of blades are either coupled to the disk or integrally formed with the disk. During operation the disk temperature may vary from room temperature to ~1200 F. from the hub to the rim, and the blade temperature can vary from ~1200 F. to ~2000 F. For the SMA to function as a damper, the SMA must be engineered to remain in a martensitic-to-austenite transformation near a specific temperature, which depends on the location in the turbomachinery. As the SMA reaches a austenite transformation start temperature ($A_s$), the SMA transforms to the austenite phase, but when the temperature rises above a austenite transformation completion temperature ($A_f$), external stress can not trigger the martensitic transformation, and the material would deform like an ordinary metal. Thus, in order to provide effective damping, the SMA must be selected such that the range between $A_s$ and $A_f$ must include the maximum operating temperature of the component, or specific area of the component, to which the SMA is to be disposed.

FIG. 2a is a graphical representation showing an example of the damping effects of a SMA, in accordance with a preferred embodiment of the present invention. FIG. 2a is for exemplary purposes only to show the general damping effects of a generic SMA on a specific component and should not be construed to represent the specific damping characteristics of every SMA. The vibrational mode 100 of a generic rotating component 102 is depicted in FIG. 2a. The shape of an outer rim of the rotating component 102 is illustrated in solid lines and the shape while in a vibration mode is illustrated by dashed lines 100. Component 102 is constructed of a parent metal, for example a high strength superalloy. FIG. 2b depicts the rotating component 102 with a superelastic SMA 108, such as Ni—Ti—Hf, disposed on an outer rim surface 102a. With the superelastic SMA 108 disposed on the outer rim surface 102a, the rim surface would exhibit the stress strain loop as depicted in FIG. 2c, wherein the $\sigma$ axis is the stress axis, and the $\epsilon$ axis is the strain axis.

FIG. 2c is focused on surface tangential tension and compression of the rotating component 102. As vibration occurs, the parent metal is cyclically loaded within its elastic range. Cycling in the elastic range dissipates little energy. However, with SMA 108 disposed on, or bonded to, the parent metal of the rotating component 102, SMA 108 has to strain cyclically to the same amplitude, or strain range, of the parent metal. By properly selecting SMA 108 such that the $A_s$ temperature of SMA 108 is substantially similar to the operating temperature of the rim surface 102a of component 102, for example within 50° F., the martensite transformation is triggered by small stress amplitudes in component 102.

Referring further to FIG. 2c, line 112 indicates the deflection or deformation of the parent material of component 102 caused by the vibration. The cyclic transformation between austenite and martensite of SMA 108 and the twinning transformation while the SMA 108 is in the martensitic phase causes hysteresis loops 114. The area of hysteresis loops 114 is proportional to the energy dissipated by SMA 108. The energy dissipation reduces the re-enforcement of the vibration from each successive cycle under resonance. This effect is not dependent on the frequencies of the vibration and can be used to attenuate unanticipated vibrational modes.

In known methods for damping vibration of a component it is critical to know the resonant frequency at which damage will occur. Extensive, time consuming, testing must be performed to determine the resonant frequency. In one preferred embodiment of the present invention, the use of SMAs to dampen vibrations is totally independent of frequency. In this embodiment, the use of SMAs merely requires thermal analysis of the component on which the SMA is to be disposed to determine the maximum operating temperature of the component. A SMA having an $A_s$ to $A_f$ range that includes the maximum operating temperature of the component is then disposed on the entire component. Thus, testing to determine the resonant frequency in various frequency modes is not needed.

In another preferred embodiment of the present invention, the SMA is only disposed on specific areas of the component 102 where high vibratory stress occurs. Therefore, use of SMAs requires stress/strain analysis to be performed on the component to determine the areas of high vibratory stress, and thermal analysis to be performed to determine a maximum operating temperature at the areas of high vibratory stress. A SMA having a martensitic-to-austenite transformation temperature substantially similar to the operating temperature of the component at a specific area of high stress/strain is selected to be disposed on the component at the related area of stress. The term 'substantially similar to' is defined herein to mean plus or minus 50° F. (10° C.). In the case where a component has more that one location of high stress/strain, the different high stress/strain locations may have different operating temperatures. For example, the operating temperature at the root of a turbine blade can vary by more than 100° F. from the operating temperature at the mid-center of the blade and/or at the tip of the blade. In this case, each area of high stress/strain will have a specific SMA having the proper martensitic-to-austenite transformation temperature, disposed thereon such that more than one SMA will be disposed on one component.

Additionally, a damage record for a specific component showing a history of damage to a specific area of the component can be utilized. By knowing an area of a component that historically is a location of damage, testing can be performed to determine the operation temperature at that specific area and then the proper SMA can be selected and disposed on the component at the location of damage susceptibility.

When the SMA is to be disposed on specific areas of high vibrational stress, the locations and maximum operating temperatures of areas of high stress/strain of the component are determined utilizing known methods of thermal analysis and structural dynamics analysis. In the case of rotating components, such as turbine engines, known methods of rotodynamic analysis are also implemented. However, it should be understood that any suitable method of determining the location and maximum operating temperature of areas of high stress/strain can be utilized within the scope of the present invention.

FIGS. 3a and 3b are an example of a structural dynamics analysis for a turbine engine blade 200, showing the location of areas of high vibrational stress. FIG. 3a shows a structural analysis image of a suction side of blade 200 and FIG. 3b shows a structural analysis image of a pressure side of blade 200. FIG. 3a indicates high vibrational stress areas 208 on the suction side of the blade and FIG. 3b indicates high vibrational stress areas 212 on the pressure side of the blade. FIGS. 3a and 3b show that, in this example, the high vibrational stress areas 208 and 212 are near a blade platform, or base 216, a mid-span of the leading edge (LE) 220 and a blade tip 224 near a blade shroud. Subsequent thermal analysis testing of the blade will indicate approximate maximum operating temperatures of the blade at high stress areas 208 and 212. For example, thermal analysis may indicate that the maximum operating temperature of high stress areas 208 and 212 near the blade platform 216 is approximately 500° F., while the maximum operating temperature of stress areas 208 and 212 near the blade tip 224 is approximately 1400° F.

Once the locations and maximum operating temperatures of stress areas 208 and 212 are determined, suitable SMAs having a martensitic-to-austenite transformation temperature substantially similar to the maximum operating temperatures are selected and disposed on the blade at the areas 208 and 212. The cross-hatched areas shown in FIGS. 3a and 3b indicate the areas of the blade on which SMAs would be disposed. During operation of the blade, the SMAs will follow the strain of the substrate blade material such that as strains are induced in the SMAs during operation, energy dissipation will occur. It is envisioned that each SMA would be applied in a separate processing step with masking such that each SMA is disposed on only the selected high stress area.

The amount of damping provided by the SMA will increase with the thickness of the SMA disposed on the component. For example, the thickness of the SMA on the turbine blade may range from 0.001 inches to 0.020 inches, preferably from 0.005 inches to 0.010 inches, such that the flow of gas through the turbine is not reduced. However, the thickness of the SMA on turbine parts that are out of the gas flow stream, such as the disk, can be any applicable thickness, limited only by the geometry of the disk, e.g. the space between the disk and a turbine housing. Preferably, the thickness of SMA on parts that are out of the stream of flow is less than 0.100 inches. When the SMA is only disposed at areas of high stress, as opposed the SMA being disposed on the entire component, it is anticipated that the area of coverage would be 110% to 140% of the area of high stress. Preferably, the SMA is disposed on 120% of the area of high stress, as indicated in FIG. 3 by the cross-hatched areas shown in FIGS. 3a and 3b.

Additionally, the SMA can be disposed on the component in a smooth or textured surface, depending on the operational environment of the related component. For example, in the case of a turbine engine blade a smooth surface is desirable, while SMAs disposed on a turbine engine disk or rotor are preferably disposed having ribs or protrusions that increase a radius of bending. When the disk or rotor bends under vibration, the ribbed or protruded SMA disposed on the disk or rotor experiences a higher level of strain due to the increased bending radius. The ribs or protrusions allow more flexing of the SMA and allow more energy dissipation due to the hysteresis loops generated by the SMA.

Furthermore, copper based SMAs can be used to dampen vibrations of components exposed to a hydrogen environment, for example high performance rocket engine components. It is known that many common alloys are susceptible to hydrogen embrittlement when exposed to a hydrogen environment. In accordance with the present invention, copper or copper-aluminum based SMA, such as Cu—14–14.5 wt. % Al—3–4.5 wt. % Ni, Cu—15 at. % Sn, Cu—38.5–41.5 wt. % Zn, and Mn—5–35 at. % Cu, can be deposed on high stress/strain areas of a component exposed to a hydrogen environment to dampen potentially damaging vibrations without being subject to hydrogen embrittlement failure.

The invention includes disposing SMAs either on an entire component or on a limited surface of a component where damage due to vibrational forces is a concern. The SMAs are disposed on the component utilizing any suitable method. For example, the SMA may be disposed on the component using such methods as physical vapor deposition, thermal spray cladding, brazing, welding, and mechanical attachment. The SMA absorbs energy as the component vibrates, thereby damping the vibration and providing more reliable components.

While the invention has been described in terms of various specific embodiments, those skilled in the art will recognize that the invention can be practiced with modification within the spirit and scope of the claims.

What is claimed is:

1. A method for damping vibrations in a turbine engine during operation, wherein said method comprises:
   determining at least one area of high vibratory stress on a component of the turbine engine;
   determining at least an approximate maximum operating temperature at the area of high vibratory stress;
   disposing a shape memory alloy (SMA) on a surface of the component at the area of high vibratory stress such that the SMA is an integral part of the surface; and
   utilizing hysteresis damping to dampen vibrations at the area of high vibratory stress based on the approximate maximum operating temperature.

2. The method of claim 1, wherein determining at least one area of high vibratory stress comprises performing structural dynamics analysis on the component.

3. The method of claim 1, wherein determining the approximate maximum operating temperature comprises performing thermal analysis of the component during operation.

4. The method of claim 1, wherein utilizing hysteresis damping comprises selecting the SMA to have a martensitic-to-austenite transformation temperature substantially similar to the approximate maximum operating temperature of the component at the area of high vibratory stress.

5. The method of claim 1, wherein disposing the selected SMA comprises applying the SMA to the area of high vibratory stress using physical vapor deposition.

6. The method of claim 1, wherein disposing the selected SMA comprises brazing the SMA to the area of high vibratory stress.

7. The method of claim 1, wherein disposing the selected SMA comprises thermally spraying a SMA coating on the area of high vibratory stress.

8. The method of claim 1, wherein disposing the selected SMA comprises at least one of welding the SMA to the area of high vibratory stress and mechanically attaching the SMA to the area of high vibratory stress.

9. A turbine engine resistive to vibratory damage during operation, said turbine engine comprising:
   a housing;
   a disk rotatably mounted within said housing;
   at least one blade connected to said disk, at least one of said disk and said blade having at least one area susceptible to high vibratory stress during operation of said engine; and
   a shape memory alloy (SMA) disposed on a surface of said blade or said disk at said area of high vibratory stress such that the SMA is an integral part of said surface, the SMA for dissipating vibrational energy in said turbine engine, wherein the dissipation of vibrational energy is a result of hysteresis loops generated by the SMA.

10. The engine of claim 9, wherein said area of high vibratory stress has at least an approximate maximum operating temperature.

11. The engine of claim 10, wherein said SMA has a martensitic-to-austenite transformation temperature.

12. The engine of claim 11, wherein said martensitic-to-austenite transformation temperature of said SMA is substantially similar to the approximated maximum operating temperature of said area of high vibratory stress.

13. The engine of claim 9, wherein said SMA is disposed on said blade using physical vapor disposition.

14. The engine of claim 9, wherein said SMA is disposed on said blade by brazing the SMA to the area of high vibratory stress.

15. The engine of claim 9, wherein said SMA is disposed on said blade by thermally spraying the SMA on the area of high vibratory stress.

16. The engine of claim 9, wherein said SMA is disposed on said blade by at least one of welding the SMA to the area of high vibratory stress and mechanically attaching the SMA to the area of high vibratory stress.

17. A method for damping vibrations in a turbine during operation, wherein said method comprises:
   performing thermal analysis of the turbine to determine at least an approximate maximum operating temperature;
   selecting a shape memory alloy (SMA) having a martensitic-to-austenite transformation temperature substantially similar to the approximate maximum operating temperature of the turbine;
   disposing the SMA on a surface of a component of the turbine at a location on the component of high vibratory stress such that the SMA is an integral part of the surface; and
   utilizing hysteresis damping to dampen operational vibrations in the turbine independent from a determination of a resonant frequency of vibration in the turbine.

18. The method of claim 17, wherein disposing the SMA comprises at least one of:
   applying the SMA to the turbine using physical vapor deposition;
   applying the SMA to the turbine using thermal spray cladding;
   brazing the SMA to the turbine;
   welding the SMA to the turbine; and
   mechanically attaching the SMA to the turbine.

* * * * *